United States Patent [19]

Kim

[11] Patent Number: 5,402,244
[45] Date of Patent: Mar. 28, 1995

[54] VIDEO SIGNAL TRANSMISSION SYSTEM WITH ADAPTIVE VARIABLE LENGTH CODER/DECODER

[75] Inventor: Sang-Ho Kim, Seoul, Rep. of Korea
[73] Assignee: Daewoo Electronics Co., Ltd., Seoul, Rep. of Korea
[21] Appl. No.: 143,175
[22] Filed: Oct. 26, 1993
[30] Foreign Application Priority Data
Oct. 26, 1992 [KR] Rep. of Korea ............... 92-19746
[51] Int. Cl.⁶ .................................... H04N 1/417
[52] U.S. Cl. ........................ 358/261.2; 358/430; 348/405; 375/246
[58] Field of Search ............. 358/261.1, 261.2, 430; 348/404, 405, 410, 412; 375/25, 27, 33

[56] References Cited

U.S. PATENT DOCUMENTS 4,816,914  3/1989  Ericsson ........................ 348/405
4,942,467  7/1990  Waldman et al. ............... 348/412

*Primary Examiner*—Edward L. Coles, Sr.
*Assistant Examiner*—Thomas D. Lee
*Attorney, Agent, or Firm*—William F. Pinsak

[57] ABSTRACT

Disclosed herein is a system which is capable of providing a high efficient bit rate reduction by selectively employing two or more variable length code tables, depending on the magnitude of the quantization parameter employed in the digitalization process. The system includes a transmitter having a differential pulse code modulator for producing differential signal samples quantized by employing two or more quantization parameters and a variable length coding circuit. The variable length coding circuit for performing a variable length coding process comprises four variable length coding lockup tables for storing variable length code words, each of the variable length coding lockup tables reflecting a statistic of the signal words quantized by each of the quantization parameters; and switching circuit responsive to each of the quantization parameters for selecting one variable length coding lookup table so as to carry out a variable length coding operation. A receiver includes a variable length decoding circuit comprising four variable length decoding lockup tables for differential signal samples, each of variable length decoding lockup tables corresponding to each of the lockup tables; and a switching circuit responsive to each of the quantization parameters for selecting one variable length decoding lookup table so as to carry out a variable length decoding operation.

3 Claims, 4 Drawing Sheets

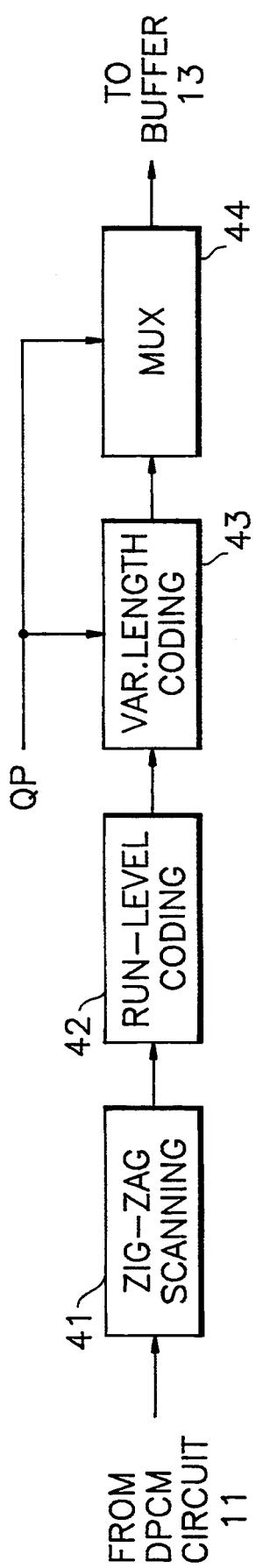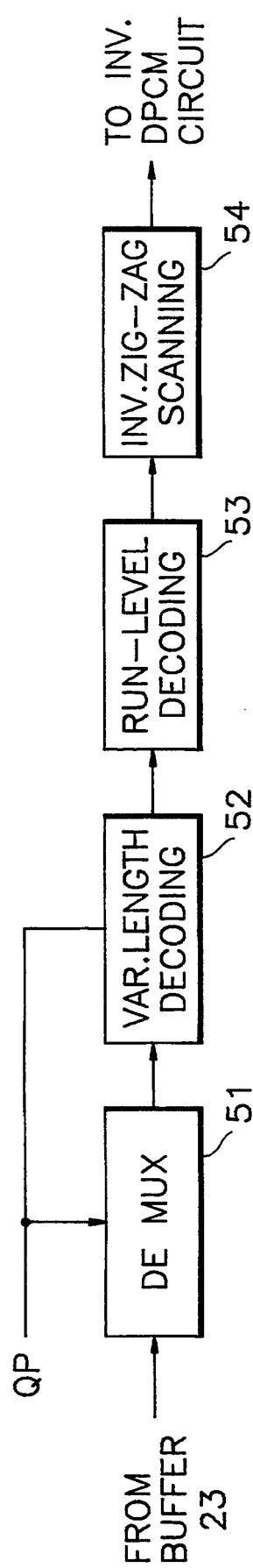

VIDEO SIGNAL TRANSMISSION SYSTEM WITH ADAPTIVE VARIABLE LENGTH CODER/DECODER

FIELD OF THE INVENTION

The present invention relates to a system for the transmission of a video signal from a transmitter to a receiver; and, more particularly, to a system for the transmission of a video signal in a digitized form, which is capable of providing an efficient bit rate reduction through the use of an adaptive variable length coder/decoder.

DESCRIPTION OF THE PRIOR ART

In recent days, digitizing analog signals has become a focus of heightened attention. In various electronic-/electrical applications such as high definition television and video telephone systems, an image signal may need to be transmitted in a digitized form due to the known advantage or capability of noise removal. Unfortunately, however, an excessively large number of bits of digital data is required to represent an analog signal so as to obtain a desired level of transmission quality.

Accordingly, various techniques have been developed to deal with the problem of excessively high bit rates. These techniques are designed to reduce the number of bits per each analog signal sample or the number of samples to be transmitted, or a combination of both.

A widely known bit rate reduction technique, which strives to reduce the number of bits per sample, is the differential pulse code modulation (DPCM). Therein, a prediction signal is subtracted at the transmitter from a video signal sample to generate a differential signal sample which is quantized and encoded to digital data. The digital data is then transmitted via a transmission medium to a receiver where it is converted back to its original video signal by means of a circuit which integrates the subtracted prediction signal. The bit rate reduction is achieved by taking advantage of the fact that the differential signals are generally distributed over a small dynamic range and consequently can be represented by a smaller number of bits.

Another known technique for achieving a bit rate reduction is the variable length coding ("VLC") technique, which employs a variable length coding lookup table, wherein one code word from the table may be assigned to a source code word. More specifically, a shorter code word is assigned to a source code word which statistically occurs more frequently. The contents of the variable length coding lookup table and the assignment depend on the type of the analog signal. After the transmission, the variable length code words are reconverted into the original source code words.

Such a variable length coding technique can be applied to the digitized differential signal samples obtained by using the DPCM as disclosed in, e.g., Pratt, *Image Transmission Techniques*, pp16–19, Academic Press, New York (1979). This variable length coding technique typically employs only one variable length code lookup table representing the entire statistics of digitized differential signal samples. However, such a single variable length coding lookup table may be insufficient to provide an adequate bit rate reduction especially when the statistics of the signal samples change locally.

One of the systems to remedy this drawback is disclosed in U.S. Pat. No. 4,957,688 issued on Sep. 18, 1990, which comprises a variable length coder having a computation circuit for periodically calculating the local statistics of the video signal in order to selectively use one of two variable length coding tables.

Another system is proposed in an article by Yoich Yagasaki et al., "Coding of Moving Pictures and Associated Audio" ISO/IEC JTC1/SC2/WG11/MPEG92 (Sep. 1992), which includes two code tables for intra/inter frame coding.

Although these systems may provides a further bit rate reduction, they fail to deal with the statistical local variations due to changes in the quantization parameter ($Q_p$).

SUMMARY OF THE INVENTION

It is, therefore, an object of the invention to provide a video signal transmission system which is capable of providing an efficient bit rate reduction by selectively employing two or more variable length code tables, depending on the magnitude of the quantization parameter employed in the digitalization process.

In accordance with the invention, there is provided a system for the transmission of a video signal from a transmitter to a receiver in a digitized form, the transmitter including a differential pulse code modulator which produces, from the video signal, an output signal consisting of differential signal samples quantized by employing two or more quantization parameters, the differential signal samples being submitted to a variable length coding circuit for performing a variable length coding operation wherein the differential signal samples are converted to variable length code words which are then transmitted to the receiver, and the receiver including a variable length decoding circuit for performing a variable length decoding operation wherein the variable length code words received from the transmitter are converted back to the differential signal samples of a fixed length which are then applied to a differential pulse code demodulator to recover the video signal, characterized in that the variable length coding circuit comprises: two or more variable length coding lookup tables for storing variable length code words, each of said variable length coding lookup tables reflecting a statistic of simulated differential signal samples quantized by each of the quantization parameters; and selection means responsive to the quantization parameters for selecting one of the variable length coding lookup table corresponding thereto so as to carry out the variable length coding operation; and that the variable length decoding circuit comprises: two or more variable length decoding lookup tables for storing the differential signal samples, said variable length decoding lookup tables corresponding to each of the variable length coding lookup tables; and selection means responsive to each of the quantization parameters for selecting one of the variable length decoding lookup table corresponding thereto so as to carry out the variable length decoding operation.

BRIEF DESCRIPTION OF THE DRAWINGS

The above and other objects and features of the present invention will become apparent from the following description of preferred embodiments given in conjunction with the accompanying drawings, in which;

FIGS. 2A and 2B are the respective schematic block diagrams of the variable length coder and the decoder shown in FIG. 1;

DETAILED DESCRIPTION OF THE PREFERRED EMBODIMENTS

Figure 1:
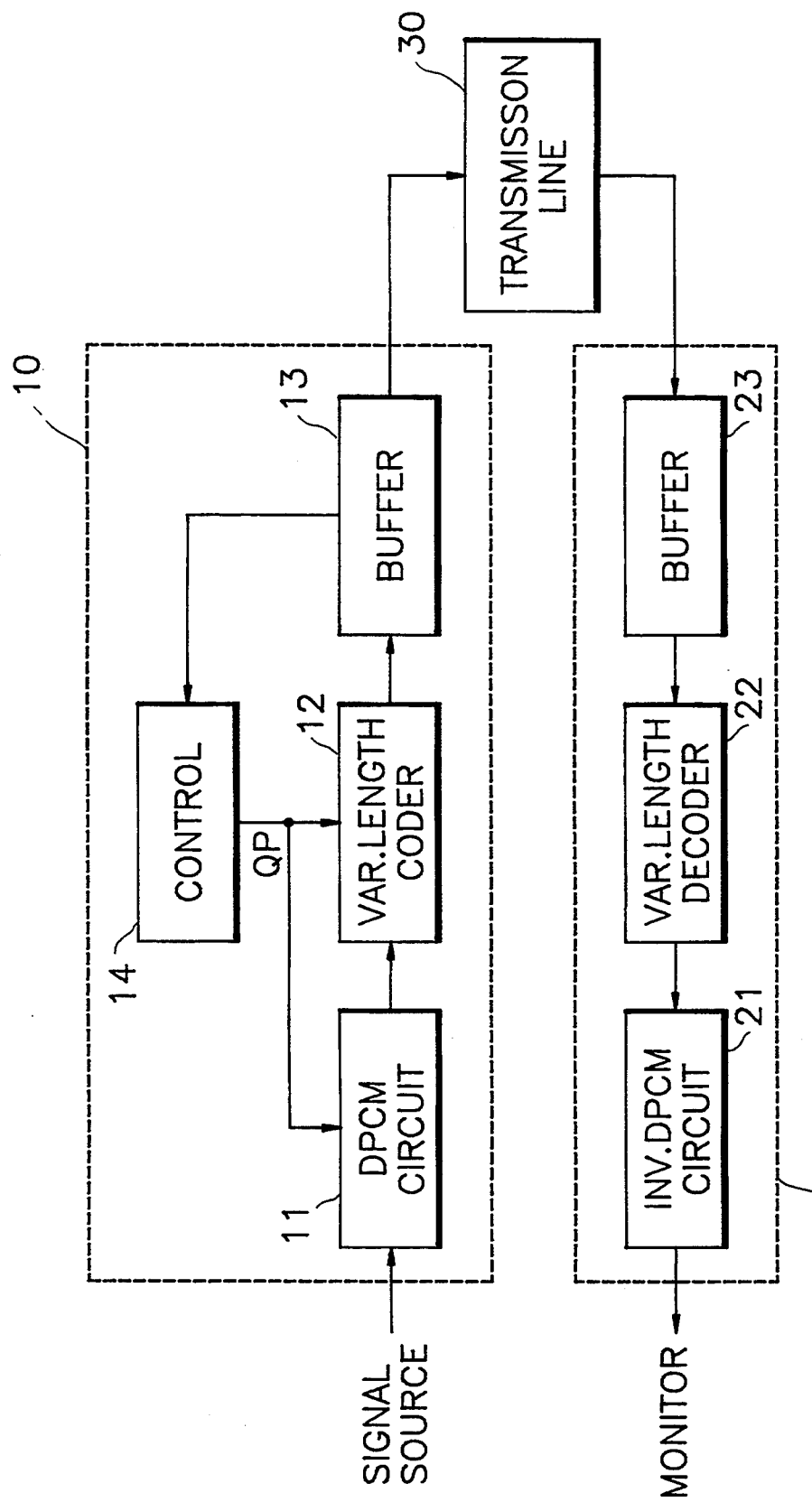
FIG. 1 is a schematic diagram depicting a system for transmitting video signals in accordance with the invention.

Referring to FIG. 1, there is schematically shown a general structure of a transmission/receiving system for transmitting video signals employing a VLC coder and a decoder in accordance with a preferred embodiment of the present invention. The system includes a transmitter 10 and a receiver 20. The system is provided from a signal source (not shown), for example, a video camera, with a video signal in the form of a sequence of fixed-length video signal samples. These samples are applied to a differential pulse code modulation (DPCM) circuit 11, in which they are converted into code words of a fixed length, denoted as DPCM samples hereinafter. In their turn, these DPCM samples are applied to a variable length coder 12, wherein they are converted into variable length code words, denoted as VLC samples hereinafter. These VLC samples are applied to a buffer 13 before they are transmitted to the receiver 20 via a transmission line 30. The buffer 23 is used to obtain a predetermined fixed bit rate on the transmission line, in spite of the fact that the VLC samples which occur at a predetermined fixed length are formed of different numbers of bits. For similar purposes, the receiver 20 includes a buffer 23 which supplies the VLC samples received from the transmission line 30 to a variable length decoder 22, wherein they are converted into the DPCM samples of a fixed length. Thereafter these DPCM samples are applied to an inverse DPCM circuit 21 which converts them into video signal samples which are also of a fixed length. These video signal samples correspond to the video signal samples generated from the signal source. The receiver 20 then applies these video signal samples to, for example, a monitor(not shown). The DPCM and inverse DPCM circuits are generally known(see, for example, Two-Dimensional Signal and Image Processing, Prentice-Hall, International Edition, pp 627–630 (1990)). The VLC circuits are also known in general (see, for example, Two-Dimensional Signal and Image Processing, Prentice-Hall, International Edition, pp 613–616 (1990)).

As is known in the art, the DPCM circuit 11 includes a Discrete Cosine Transform(DCT) circuit which serves to convert the video signal into its differential signal in a sequence of DCT coefficients through a block-by-block process, and a quantization circuit which is adapted to quantize the DCT coefficients with a quantization parameter(Qp) and to convert them into the DPCM samples. A block of video signal samples is generally defined as 8×8 video signal samples and said Qp is adjusted as a function of the filling status of the buffer 13 (see, e.g., U.S. Pat. Nos. 4,706,260 issued on Nov. 10, 1987 and 4,894,713 issued on Jun. 16, 1990). As shown in FIG. 1, a control circuit 14 monitors the filling status of the buffer 13 and adjusts the quantization parameter which is then coupled to the DPCM circuit 11 and the variable length coding circuit 12. Therefore, the DCT coefficients may be quantized by different quantization parameters so that the statistics of the DCT coefficients may not necessarily be uniform throughout the entirety of an image. The DCT coefficients have a statistic distribution in the frequency region between a d.c. component zone and a high frequency zone and have different amplitude levels, respectively. The amplitude levels of the DCT coefficients are locally distributed; i.e., concentrated in a low frequency zone which includes the d.c. component. This shows that non-zero or significant DCT coefficients mainly appear in the low frequency zone; and that zero or insignificant DCT coefficients mainly appear in the high frequency zone, which may be truncated or need not always be transmitted.

Referring to FIGS. 2A and 2B, the VLC coder 12 includes a zig-zag scanning block 41, a run-level coding block 42, a variable length coding block 43 and a multiplexer 44. The VLC decoder, which is adapted to carry out an inverse variable length coding process, includes a multiplexer 51, a VLC decoding block 52, a run-level decoding block 53 and an inverse zig-zag scanning block 54.

The DPCM samples are now provided to the zig-zag scanning block 41 for carrying out the zig-zag scanning which is preferably operated progressively from low frequency DPCM samples towards high frequency DPCM samples. The scanned DPCM samples are then coupled to the run-level coding block 42 wherein they are converted to fixed length run-level code words sequentially. The fixed length run-level code words are coupled to the VLC coding block 43 which includes a memory, for example, a ROM, which receives by way of addressing a sample to be coded (in this case, a run-level code word). The ROM may, for instance, have 4 memory portions to function as 4 variable length coding lookup tables, each containing VLC words, and which can be selectively addressed by run-level code words. The selection of the variable length coding lookup tables in the VLC coding process is achieved by referencing the QP's used in the DCT coefficient quantization process. The run-level code words are converted at the VLC coding block 43 to VLC words which are coupled through the multiplexer 44 to the buffer 13 (shown in FIG. 1), together with the Qp's used in the variable length coding operation.

The VLC words and the QP's are then coupled through the transmission line 30, the buffer 23, and the demultiplexer 51 to the VLC decoding block 52 which includes 4 VLC decoding lookup tables. Each of the 4 variable length decoding lookup tables corresponds to each of the 4 variable length coding lookup tables and contains run-level code words addressable by the VLC words. The selection of the variable length decoding lookup tables is made by referencing the QP's received from the transmitter. Consequently, the VLC words are converted at the VLC coding block 43 to run-level code words which are coupled through the run level decoding block 53. As is known in the art, the run-level code words are converted at the inverse zig-zag scanning block 54 to DPCM samples which are then coupled to the DPCM circuit 21 shown in FIG. 1, which converts them into video signal samples corresponding to the video signal samples from the signal source.

Figure 3:
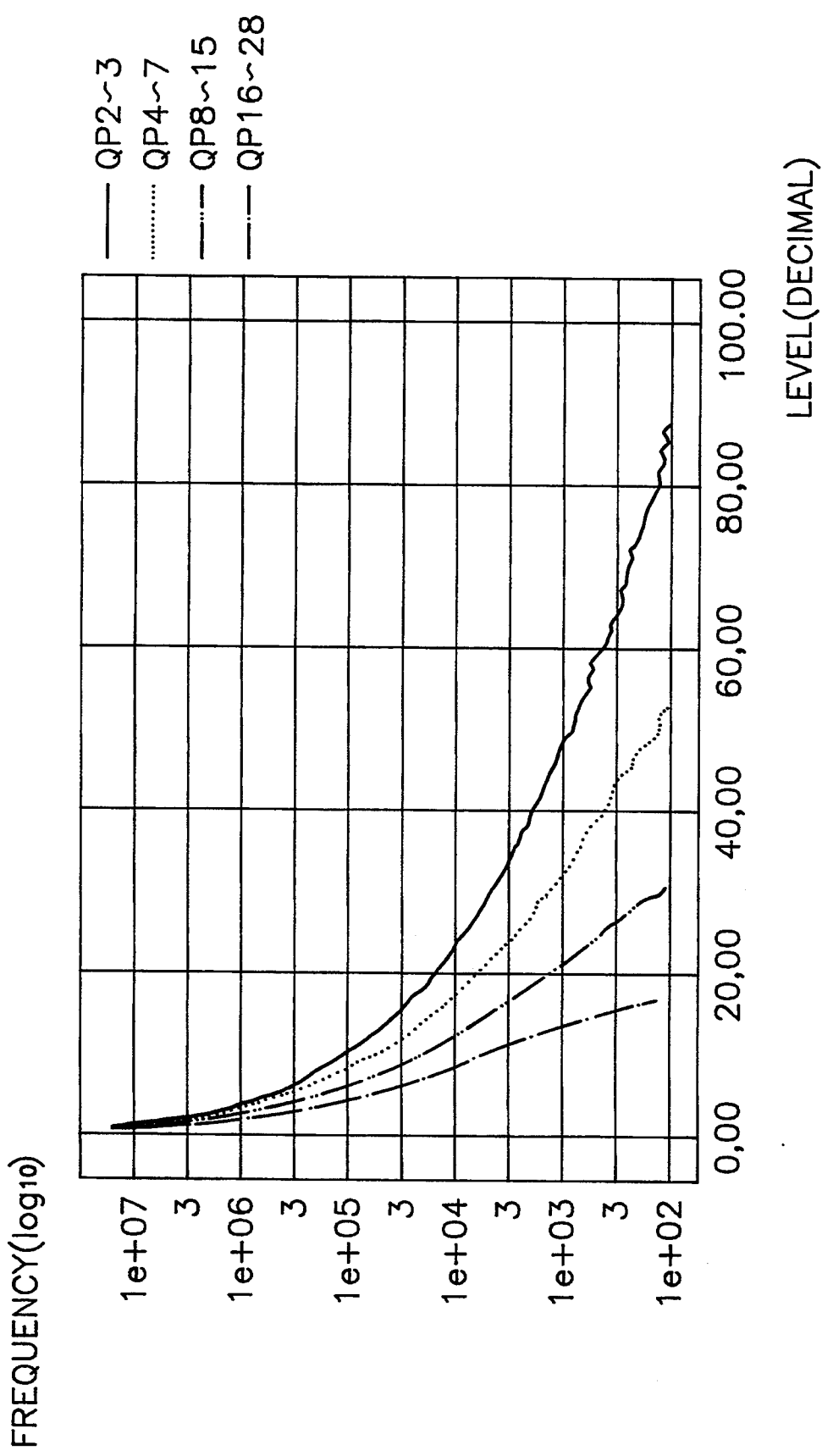
FIG. 3 is a graph illustrating the difference of the statistics due to the variation of the quantization parameters.

In FIG. 3, there are shown variations in the statistical distribution of the DPCM samples depending on the magnitude of the quantization parameter (Qp). As is shown, the x-axis represents the amplitude level distribution (in the decimal system) and the y-axis represents the frequency in logarithm. The simulation is performed with Qp=2 to 3, Qp=4 to 7, Qp=8 to 15 and Qp=16 to 28, using the following images:

| Fruits | 1920 × 1035, MUSE format |
|---|---|
| Fashion Model | 1920 × 1035, MUSE format |
| Football | 720 × 480, CCIR601 format |
| Crowd | 720 × 480, CCIR601 format |
| Mobile Toy & Calendar | 720 × 480, CCIR601 format |
| Flower Garden | 720 × 480, CCIR601 format |

From FIG. 3, it can be readily understood that smaller quantization parameters have a larger statistical distribution of the amplitude level and the statistical distribution varies considerably depending on the size of the quantization parameter. It is also clear that a single VLC table may not be able to properly represent the DPCM samples when there is a variation in the quantization parameters.

Figure 4:
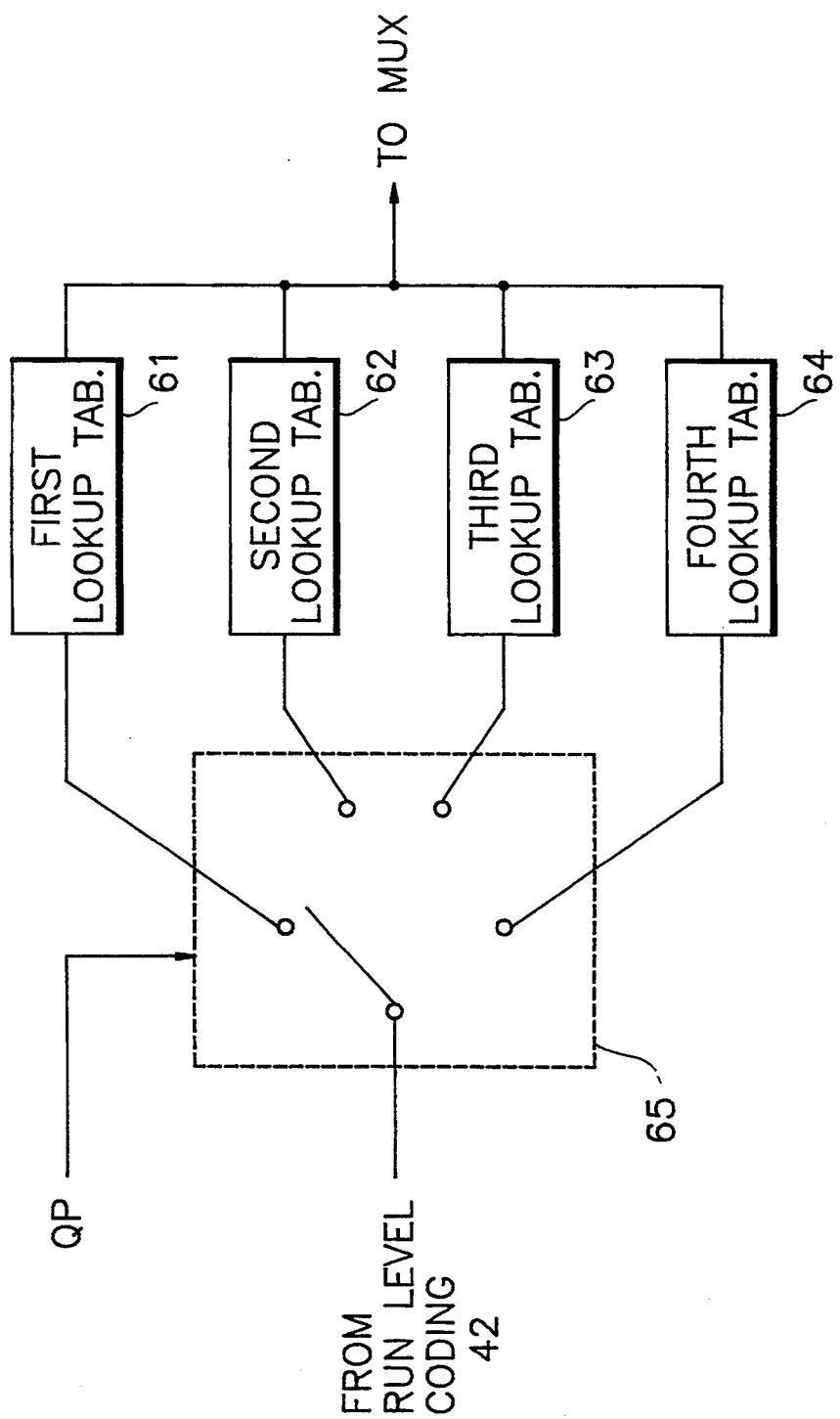
FIG. 4 is a schematic block diagram of the variable length coding block shown in FIG. 2.

Referring now to FIG. 4, the VLC coding block shown in the VLC coding circuit of FIG. 2 is arranged to perform an adaptive variable length coding, by employing the ROM in the VLC coding block 43 which contains different lookup tables 61, 62, 63, and 64, one of which is selected depending on the magnitude of the quantization parameter (Qp). Depending on the Qp, one lookup table is chosen from the 4 lookup tables by means of a switching circuit 65. The DPCM samples are then, by referencing the lookup table selected, converted to VLC samples. As is well known in the art, the lookup tables 61, 62, 63, and 64 are designed for the respective quantization parameters: this is, a first lookup table 61 reflects the a statistical distribution of DPCM samples when Qp is in the range of 2 to 3; a second lookup table 62 has the statistic thereof when Qp is in the range of 4 to 7; a third lockup table 63 represents the statistical distribution of DPCM samples when Qp is in the range of 8 to 15; the fourth lookup table 64 indicates the statistic of DPCM samples when Qp is in the range of 16 to 28. Accordingly, if Qp is 3 from the control circuit 14 shown in FIG. 1, the lookup table 61 is selected.

As is well known in the art, when the quantization parameter is in the range of 2 to 3, the lookup table 61 may be mathematically obtained by a probability function expressed as follows:

$$Pr\{ run = r, level = l | 2 \leq Qp \leq 3 \} = \sum_{k=2}^{3} [Pr(run = r, level = l | Qp = k) \times Pr(Qp = k)]$$

wherein Pr is the probability; and r, l, and k are positive integers.

In a similar manner, the lookup tables 62, 63, and 64 may be readily obtained. The switching circuit 65 serves to receive the Qp from the control circuit 14 and to select the corresponding lookup table.

Referring back to FIG. 2, the quantization parameters used for the variable length coding operation are simultaneously coupled to the variable length decoding circuit 22 through the buffer 13, the transmission line 30 and the buffer 23 shown in FIG. 1. The variable length decoder 22, as in the variable length coder 12, is also provided with 4 lookup tables corresponding to the lookup tables 61, 62, 63, and 64, and a switching circuit. Each of the variable length decoding lookup tables contains run-level code words addressable by VLC words so that the VLC words are converted at the VLC decoding block 52 to run-level code words which are coupled through the run level decoding block 53. As is mentioned above, the run-level code words are converted at the inverse zig-zag scanning block 54 to DPCM samples which are then coupled to the DPCM circuit 21 shown in FIG. 1, which converts them into video signal samples corresponding to the video signal samples obtained from the signal source.

As may be seen from the above, the present invention achieves a highly efficient bit rate reduction through the use of a number of lookup tables reflecting the statistical local variations caused by the use of different quantization parameters, as called for in order to control the number of bits generated during the digitization precess.

While the present invention has been shown and described with reference to the particular embodiments, it will be apparent to those skilled in the art that many changes and modifications may be made without departing from the spirit and scope of the invention as defined in the appended claims.

What is claimed is:

1. A system for the transmission of a video signal from a transmitter to a receiver in a digitized form, the transmitter including a differential pulse code modulator which produces, from the video signal, an output signal consisting of differential signal samples quantized by employing two or more quantization parameters, the differential signal samples being submitted to a variable length coding circuit for performing a variable length coding operation wherein the differential signal samples are converted to variable length code words which are then transmitted to the receiver, and the receiver including a variable length decoder circuit for performing a variable length decoding operation wherein the variable length code words received from the transmitter are converted to differential signal samples of a fixed length which are then applied to a differential pulse code demodulator to recover the video signal, characterized in that the variable length coding circuit comprises:

two or more variable length coding lookup tables for storing variable length code words, each of the variable length coding lookup tables reflecting a statistic of simulated differential signal samples quantized by each of the quantization parameters; and selection means responsive to each of the quantization parameters for selecting one of the variable length coding lookup tables corresponding thereto so as to carry out the variable length coding operation;

and that the variable length decoding circuit comprises:

two or more variable length decoding lookup tables for storing the differential signal samples, each of the variable length decoding lookup tables corresponding to each of the variable length coding lookup tables; and selection means responsive to each of the quantization parameters input from the transmitter for selecting one of the variable length decoding lookup tables corresponding thereto so as to carry out variable length decoding operation.

2. A transmitter for the transmission of a video signal from a transmitter to a receiver in a digitized form, the transmitter including a differential pulse code modulator which produces, from the video signal, an output signal consisting of differential signal samples quantized by employing two or more quantization parameters, the differential signal samples being submitted to a variable length coding circuit for performing a variable length coding operation wherein the differential signal samples are converted to variable length code words which are then transmitted to the receiver, characterized in that the variable length coding circuit comprises:

- two or more variable length coding lookup tables for storing variable length code words, each of the variable length coding lookup tables reflecting a statistic of simulated differential signal samples quantized by each of the quantization parameters; and
- selection means responsive to each of the quantization parameters for selecting one of the variable length coding lookup tables corresponding thereto so as to carry out the variable length coding operation.

3. A receiver for the reception of a video signal from a transmitter in a digitized form, the transmitter including a differential pulse code modulator which produces, from the video signal, an output signal consisting of differential signal samples quantized by employing two or more quantization parameters, the differential signal samples being submitted to a variable length coding circuit for performing a variable length coding operation wherein the differential signal samples are converted to variable length code words which are then transmitted to the receiver, wherein the variable length coding circuit comprises two or more variable length coding lookup tables for storing variable length code words, each of the variable length coding lookup tables reflecting a statistic of simulated differential signal samples quantized by each of the quantization parameters and selection means responsive to each of the quantization parameters for selecting one of the variable length coding lookup tables corresponding thereto so as to carry out the variable length coding operation, and the receiver including a variable length decoder circuit for performing a variable length decoding operation wherein the variable length code words received from the transmitter are converted to differential signal samples of a fixed length which are then applied to a differential pulse code demodulator to recover the video signal, characterized in that the variable length decoding circuit comprises:

- two or more variable length decoding lookup tables for storing the differential signal samples, each of the variable length decoding lookup tables corresponding to each of the variable length coding lookup tables; and
- selection means responsive to each of the quantization parameters input from the transmitter for selecting one of the variable length decoding lookup tables corresponding thereto so as to carry out variable length decoding operation.

* * * * *